United States Patent [19]

Scramuzza

[11] 4,452,033
[45] Jun. 5, 1984

[54] LAWN MOWING AND TRIMMING APPARATUS

[76] Inventor: Pascal Scramuzza, 2804 D'Abadie St., New Orleans, La. 10130

[21] Appl. No.: 380,032

[22] Filed: May 20, 1982

[51] Int. Cl.³ .......................................... A01D 35/264
[52] U.S. Cl. ...................................... 56/12.7; 56/13.6; 56/320.1
[58] Field of Search .................... 56/320.1, 13.6, 12.7, 56/17.5, 320.2, 255, 6

[56] References Cited

U.S. PATENT DOCUMENTS

| | | | |
|---|---|---|---|
| 2,114,096 | 4/1938 | Noel | 56/13.6 |
| 2,245,821 | 6/1941 | Poynter | 56/13.6 |
| 2,763,116 | 9/1956 | Flinchbaugh et al. | 56/13.6 |
| 4,232,505 | 11/1980 | Walto | 56/320.1 |
| 4,351,143 | 9/1982 | Lessig | 56/320.1 |

Primary Examiner—Jay N. Eskovitz
Attorney, Agent, or Firm—Keaty & Keaty

[57] ABSTRACT

A lawn which includes a mower housing carrying a motor and including plural shafts carrying donut-like members with cutters attached thereto. The deck includes a forward portion have a protective skirt, a portion of which extends at approximately 45° to the ground.

10 Claims, 3 Drawing Figures

LAWN MOWING AND TRIMMING APPARATUS

BACKGROUND OF THE INVENTION

1. Field of the Invention

The present invention relates to a lawnmower/trimmer of novel design and which is less costly and more efficient than any similar device presently in existence. In particular, the present invention features, inter alia, positioning of all four wheels on the rear portion of the device and synchronization of two cutting elements to cut and trim the grass, weeds, etc.

2. General Background

U.S. Pat. No. 4,287,709 issued to Lowry et al. and entitled "Carriage for a Grass Trimming Device" teaches the use of a wheeled platform with a centrally located aperture for receiving and supporting the lower portion of a housing for a grass trimming device so that the cutting element of the device will extend beneath the platform and the motor housing will extend above the platform. This invention differs in nearly every respect from the present invention.

First, the wheeled platform is different than the one of the present invention as it does not comprise a protective skirt around its perimetry towards the ground.

Secondly, the Lowry patent discloses a device with two pneumatic rubber wheels located at one end, and two wheels at the opposite end. One of the principal features of our invention is the dispositioning of all wheels toward the rear of the apparatus.

Thirdly, the entire Lowry apparatus has, as its primary purpose, the function of trimming grass close to objects that cannot be cut by the conventional power or hand mower (i.e. for trimming grass). The present invention is not limited to the trimming function, but rather performs both the mowing and trimming functions. The Lowry invention provides a fifth wheel for the carriage to be tilted to facilitate trimming along the edge of a lawn. The present invention accomplishes this same purpose much easier and much better. As seen in FIG. 3 of the Lowry patent, the fifth wheel protrudes at least a couple of inches from the side of the device and this greatly impedes the blade from even getting close to such things as fences, walls, etc. It also is a more expensive and cumbersome technique than our method. The present invention accomplishes the dual purpose of mowing and trimming with no additional attachments which are both cumbersome and costly.

The rest of the patents are merely representative of what is in the prior art.

GENERAL DISCUSSION OF THE PRESENT INVENTION

For some time now, trimming devices in the form of rapidly rotated cables of nylon or the like have been employed to manicure lawns and cut weeds around objects that cannot be cut by conventional lawn-mowers due to the inability of the mower to closely approach such objects as fences, trees, walls, fixed objects, stumps, or the like.

However, none has combined the mowing and trimming functions in an efficient, workable manner, particularly in the manner in which the present invention so does.

The present invention features a steel, high-impact plastic, or any other suitable material, platform plate, or platform, to which is mounted four or more pneumatic rubber wheels on its rear portion (two or more on each side). In front of the front wheels the platform's front portion is recessed on each side. It should be noted that the platform is a single, unitary plate comprising a rectangular rear portion and a recessed rectangular front portion.

Extending down from the rear portion of the platform is a steel, or any other suitable material, protective shield plate or skirt.

Extending down from the sides of the front portion of the platform at a 90° angle (i.e. perpendicular thereto) is a steel, or any other suitable material, protective shield plate or skirt. Extending down from the front end of the front portion of the platform is a steel, or any other suitable material, protective shield plate or skirt. The purpose of these skirts is to prevent harm to the operator of the present invention which can be caused by objects being thrown from under the platform during operation.

A cylindrical steel, or any other suitable material, housing is weldably attached to a camelback steel brace/mount which is centered on the rear portion of the platform and bolted thereto. The housing encloses a combustible or electric motor and a pulley wheel which comprises a vertical shaft. Fixably mounted onto the front portion of the platform are two pulley wheels positioned in a linear fashion directly opposite each other. Both pulley wheels comprise a vertical steel shaft (hereinafter referred to as a pulley shaft) extending from the top of the pulley wheel through an orifice provided in the platform for receiving same, and thus, under the platform.

A series of four or more evenly-spaced holes are bored into the bottom part of each pulley shaft. A steel collar piece is mounted to the bottom end of each pulley shaft by means of inserting a spring pressure pin which is seated in the collar through any of the holes bored into the bottom part of the shaft. The hole selected determines the closeness of the cut to the ground. Welded to the bottom of the collar is a cylindrical steel donut which comprises a flexible, durable steel or steel/nylon cutting element in the form of a solid, flexible wire or cable such as a "piano wire". Each cutting element is at a 90° angle to (i.e., perpendicular to) each pulley shaft. The two cutting elements are prepositioned at a 90° angle to each other before operation of the invention to prevent contact with each other which would otherwise result due to the overlapping circular paths of the cutting elements when rotated to perform the cutting and trimming function.

The operation of the invention is as follows:

1. A standard rubber belt (like an automotive fan belt) is placed in a slot provided on each pulley wheel for the specific purpose of receiving the belt;

2. The belt is further placed around the vertical shaft enclosed by the housing;

3. The belt is taut when placed around the three shafts in the manner described in 1 and 2 above;

4. The motor (either combustible or electric) is started and it transmits torque to the vertical shaft enclosed by the housing which causes the shaft to rotate, thereby causing the belt to move, causing the two pulley shafts to rotate. The cutting assemblies attached to the bottom end of both pulley shafts are thereby rotated and the cutting elements make overlapping circular paths but do not make contact with each other because they are prepositioned at a 90° angle to each other to facilitate such synchronized action; thusly, the cutting elements cut and trim the grass and/or weeds under the platform.

Two important features of the present invention have been raised.

First, the present invention employs two cutting elements which operate in a synchronized fashion to cut approximately the same path width as one cutting element of twice the length, which is the conventional approach. This enables construction of a platform which is the length of the cutting element shorter than would be required in the conventional approach. This enables the invention to be more compact than the prior art provides and thus, easier to manipulate. Further, a cost savings, which can ultimately be passed on to the consumer, is realized because less steel, or whatever other material is utilized, is required to construct the platform.

Secondly, the cutting action of the cutting elements extends approximately ⅛" beyond the edge of the skirts, thereby enabling the apparatus to trim the grass and/or weeds as close to the object or obstruction as can be physically accomplished by such means as cutting shears, etc., which are manually operated.

Further, another "key" feature that the present invention teaches is the attachment of all wheels to the rear portion of the platform. This enables the operator of the invention to mow and trim along fences, walls, around stumps, poles, or any other object or obstruction without the front wheels creating a gap which can therefore not be effectively mowed. It should be noted that the weight of the motor on the rear portion of the platform prevents the front portion of the platform from inadvertently raising, etc., and as such, it balances the apparatus.

A single, unitary steel, or any other suitable material, housing is provided to cover the cylindrical housing and the pulley wheels on the platform. This further ensures safe operation of the invention.

The invention is manipulated by means of a cylindrical inverted U-shaped tube, or handlebars, which have three operating positions. The handlebars facilitate efficient operation of the invention under trees, in culverts, on lawns, and any other place where a lawnmower can be used.

Other features and advantages of the present invention will become apparent as consideration is given to the accompanying brief description taken in conjunction with the accompanying drawings.

DETAILED DESCRIPTION OF THE PREFERRED EMBODIMENT

Figure 1:
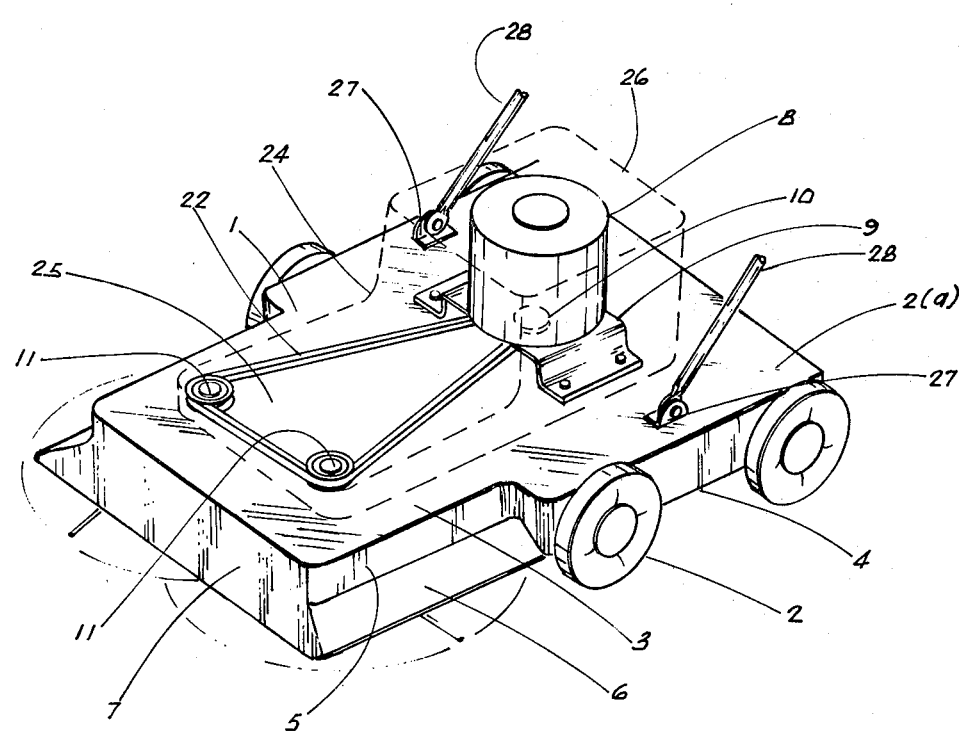
FIG. 1 provides a perspective view of the entire invention.

Referring now to the drawings, there is shown in FIG. 1 a steel, or high-impact plastic, or any other suitable material, platform plate, or platform 1, to which is mounted four or more pneumatic rubber wheels 2 on the skirt 4 of the rear portion 2(a) of the platform 1, with two or more wheels 2 on each side. Further, on each side, one or more wheels 2 are mounted near the front end of the rear portion 2(a) of the platform 1, and one or more wheels 2 are mounted near the rear end of the rear portion 2(a) of the platform 1. In front of the front wheels, the front portion 3 of the platform 1, is recessed. It should be noted that the platform 1 is a single, unitary plate comprising a rectangular rear portion 2(a) and a recessed rectangular front portion 3. Extending down from the rear portion 2(a) of the platform 1 is a steel, or any other suitable material, protective shield plate or skirt 4. Extending down from the sides of the front portion 3 of the platform 1, is a steel, or any other suitable material, protective shield plate or skirt 5. Weldably attached to the bottom end of the skirt 5 extending from the sides of the front portion 3 of the platform 1, at an approximately 45° angle thereto, is a steel, or any other suitable material, protective shield plate or skirt 6. The skirt 6 extends from the base of the skirt 5 of the sides of the front portion 3 of platform 1 to the imaginary line created by the outer edge of the rear portion 2(a) of the platform 1. Extending down from the front end of the front portion 3 of the platform 1, is a steel, or any other suitable material, protective shield plate or skirt 7. The purpose of these skirts is to prevent harm to the operator of the present invention which can be caused by objects being thrown from under the platform during operation.

Figure 2:
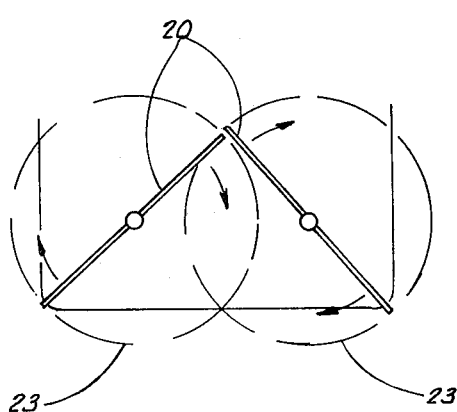
FIG. 2 provides a bottom view of the cutting elements with the arrows and phantom lines depicting the circular paths made by the synchronized, rotating action of the two cutting elements.
Figure 3:
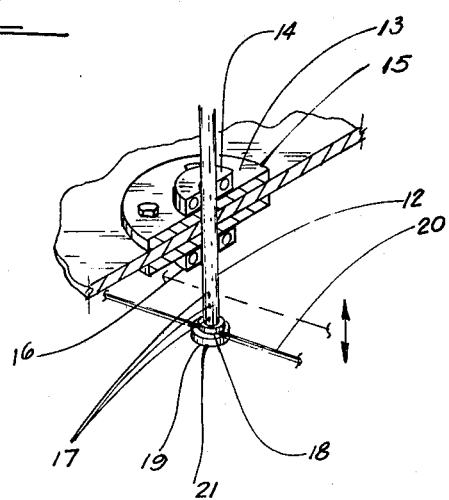
FIG. 3 provides a partial cross-sectional, partial perspective cut-away view of the pulley shaft, lower plate of a pulley wheel, collar plates and the cutting assembly.

A cylindrical steel, or any other suitable material, housing 8, is weldably attached to a camelback steel brace/mount 9 which is centered on the rear portion 2(a) of the platform 1 and bolted thereto. The housing 8 encloses a combustible or electric motor (not shown) and a pulley wheel shown by phantom lines 10a in FIG. 1 which comprises a vertical shaft (not shown). The vertical shaft rises from the platform floor and protrudes through an aperture provided in the brace/mount 9 for receiving same, thereby axially aligning the vertical shaft for transmission of torque thereto by the electric or combustible motor. Fixably mounted onto the front portion 3 of the platform 1 are two pulley wheels 11, positioned in a linear fashion directly opposite each other, each one being positioned equidistant from the front outer edge from the side outer edge of the front portion 3 of the platform 1. Both pulley wheels 11 comprise a vertical steel shaft 12 (hereinafter referred to as pulley shaft 12), extending from the top of the pulley wheel 11 through an orifice provided in the platform 1 for receiving same, and thus, under the platform, as can be seen in FIG. 3. The circular bottom plate 13 (hereinafter called plate 13) of each pulley wheel 11 is mounted to the platform 1 by means of being bolted thereto. Weldably mounted onto the surface of each plate 13 is a steel collar piece 14 which is of a smaller diameter than the diameter of plate 13. A central aperture is provided in each collar piece 14, of approximately the same diameter as each pulley shaft 12, for each pulley shaft 12 to pass through and to insure that each pulley shaft 12 remains in a fixed axis upon rotation. The combination of the collar piece 14 being welded to the plate 13 shall be hereinafter referred to as the guiding apparatus 15. A combination 16 identical to the guiding apparatus 15 is provided on the underside of the platform 1 directly beneath each guiding apparatus 15, as this is the piece to which the guiding apparatus 15 is bolted. This combination 16 further insures that each pulley shaft 12 remains in a fixed axis upon rotation. A series of two or more evenly-spaced holes 17 are bored into the bottom part of each pulley shaft 12. A steel collar piece 18 is mounted to the bottom end of each pulley shaft 12 by means of inserting a spring pressure pin (not shown), which is seated in the collar 18, through any of the holes bored into the bottom part of the shaft. The hole 17 selected determines the closeness of the cut to the ground. Welded to the bottom of the collar 18 is a cylindrical steel donut 19, which comprises a flexible, durable steel or steel/nylon cutting element 20 in the form of a thick wire or cable. Each cutting element 20 is at a 90° angle (i.e., perpendicular to) to each pulley shaft 12. The combination of the collar 18 welded to the donut-cutting element piece shall hereinafter be referred to as the cutting assembly 21. The two cutting elements 20 are positioned at a 90° angle (i.e., perpendicular to) to each other before operation of the invention so as to prevent contact with each other which would otherwise result due to their overlapping circular paths, which are represented by the phantom lines 23 in FIG. 2, when rotated to perform the cutting/trimming function.

The operation of the invention is as follows:

(1) a standard rubber belt 22 (like an automotive fan belt) is placed in a slot provided on each pulley wheel 11 for the specific purpose of receiving the belt 22;

(2) the belt 22 further placed around the vertical shaft 10 enclosed by the housing 8;

(3) the belt 22 is of such a perimeter that it is taut when placed around the three shafts (i.e., the two pulley shafts 12 and the vertical shaft 10 enclosed by the housing 8) in the manner described in (1) and (2) above;

(4) the motor (either combustible or electric) is started and it transmits torque to the vertical shaft enclosed by the housing 8 which causes the shaft 10 to rotate which thereby causes the belt 22 to move, which thereby causes the two pulley shafts 12 to rotate. The cutting assembly 21 attached to the bottom end of both pulley shafts 12 is thereby rotated, and the cutting elements 20 make overlapping circular paths 23 but do not make contact with each other because they are prepositioned at a 90° angle to each other to facilitate such synchronized action; thus, the cutting elements 20 cut and trim the grass and/or weeds under the platform 1.

It should be noted that the two cutting elements 20 operating in a synchronized fashion cut approximately the same path width as one cutting element of twice the length, which is the conventional approach. This feature enables construction of a platform 1 which is the length of the cutting element 20 shorter than would be required in the conventional approach. The circular paths 23 made by the rotating/cutting action of the cutting elements 20 extend slightly beyond the edge of the skirts 6 and 7, thereby enabling the apparatus to trim the grass and/or weeds approximately as close to the object or obstruction as can be physically accomplished by such means as cutting shears, etc., which are manually operated.

A steel, or any other suitable material, housing 24 unitarily comprising a front rectangular box housing 25 perpendicular to a rear square box housing 26 is provided to cover the cylindrical housing 8 and the pulley wheels 11 on the platform 1. The rectangular box housing 25 is of lesser height than the square box housing 26. The unitary housing 24 is hingedly attached in the rear to the platform 1. The housing 24 further ensures safe operation of the invention.

The invention is manipulated by means of a conventional inverted U-shaped tube, or handle bars (partially seen in FIG. 1) which are attached to the platform 1 at the bottom end of either vertical fork 28 of the handle bars to attachment plates provided on either side of the rear portion 2(a) of the platform 1. The handle bars 27 have three operating positions best described as 45°, 30° and 15° angles formed by the vertical forks 28 of the handle bars and the platform 1. The three positions enable the operator of the invention to cut under trees, in culverts, on lawns, and in any other place where a lawnmower can be used.

Having described the invention, it will be apparent to those skilled in this art that various modifications (e.g., the size and shape of the various parts, or materials used), may be made therein without departing from the spirit and scope of the present invention as defined in the appended claims.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A lawn-mowing and trimming apparatus which comprises:
   (a) a platform which unitarily comprises:
      (i) a rear portion;
      (ii) a recessed front portion;
   (b) a skirt extending downwardly from the rear portion of the platform;
   (c) a skirt extending downwardly from the front portion of a platform;
   (d) four or more pneumatic rubber wheels mounted to said skirt and downwardly from said rear portion of said platform, two or more on each side thereof;
   (e) a housing mounted to said rear portion of said platform which encloses:
      (i) a motor;
      (ii) a pulley wheel which comprises a vertical shaft, said shaft being torqued by said motor;
   (f) pulley wheels mounted on said front portion of said platform, each of said pulley wheels comprising a pulley shaft;
   (g) a cutting assembly mounted to the bottom end of each of said pulley shaft, which comprises:
      (i) a collar;
      (ii) a cylindrical donut fixedly attached to the bottom of said collar, wherein said donut comprises a cutting element;
   (h) a single, unitary major housing which encloses the housing mounted on the rear portion of the platform and said pulley wheel;
   (j) handle bars means for manipulating the apparatus.

2. A lawn-mowing and trimming apparatus which comprises:
   (a) a single, unitary high-impact material platform, comprising:
      (i) a rectangular rear portion;
      (ii) a rectangular front portion which is recessed from the foremost edge of the rear portion of the platform;
   (b) a high impact material rear protective shield means extending downwardly from the rear portion of the platform;

(c) a high impact material side protective shield means extending downwardly from the sides of the front portion of the platform;

(d) a plurality of pneumatic rubber wheels mounted to the rear protective shield means, the front wheels, on each side, being mounted near the front end of the rear portion of the platform and the rear wheels, on each side, being mounted near the rear end of the rear portion of the platform;

(e) a high impact material protective skirt rigidly attached at an approximately 45° angle to the bottom end of the side protective shield means; this skirt extending from the base of the side protective shield means to an imaginary line created by the outer edge of the rear portion of the platform;

(f) a high impact material front protective shield means extending downwardly from the front end of the front portion of the platform;

(g) a cylindrical high impact material housing rigidly, attached to a camelback steel brace, which is securedly centered on the rear portion of the platform, said housing enclosing:
  (i) a motor means which is attached to the brace by means of engine mounts;
  (ii) a rear pulley wheel having a vertical shaft which rises from the platform floor and protrudes through an apperture provided in the brace for receiving same;

(h) a pair of front pulley wheels fixedly mounted into the front portion of the platform and positioned in a linear fashion directly opposite each other, each of said pulley wheels being disposed equidistantly from the front outer and from the side outer edges of the front portion of the platform, each of said front pulley wheels comprising a vertical steel shaft, extending from the top of the pulley wheel through an orifice provided in the platform for receiving same, and thus, under the platform;

(i) a plurality of evenly-spaced holes bored in the bottom part of each of said front pulley wheel shafts;

(j) a steel collar means mounted at the bottom part of each of said front pulley wheel shafts by means of inserting a spring pressure pin seated in the collar means through any of said holes at the bottom part of the shaft, a selection of the hole determining the closeness of a cut to the ground;

(k) a cylindrical steel donut welded to the bottom of each collar means, said donut having a flexible, durable cutting element in a form of a cable, each cutting element being perpendicular to said pulley wheel shaft and to each other;

(l) a single, unitary housing, made of a durable material, which encloses the cylindrical housing and the pulley wheels comprising:
  (i) a front portion rectangular box housing;
  (ii) a rear portion square box housing positioned perpendicular to the rectangular box housing;

(m) inverted U-shaped tube handle bars, which are attached to the rear portion of the platform through vertical forks and attachment plates provided on either side of the rear portion of the platform, said handle bars being adjustable at three operating positions, 45°, 30° and 15° angles, formed by the vertical forks of the handle bars and the platform.

3. The lawn-mowing and trimming apparatus of claim 2, wherein said single, unitary platform is made of steel or high impact plastic or any other suitable material and comprises:
  (a) a rectangular rear portion;
  (b) a rectangular front portion which is recessed from the outer edge of the rear portion of the platform in front of the front wheels.

4. The lawn-mowing and trimming apparatus of claim 2, wherein said pneumatic rubber wheels are mounted to the protective rear shield means extending from the rear portion of the platform.

5. The lawn-mowing and trimming apparatus of claim 2, wherein said rear protective shield means extending down from the rear portion of the platform is a shield plate made of steel, or any other suitable material.

6. The lawn-mowing and trimming apparatus of claim 2, wherein said side protective shield means extending down from the sides of the front portion of the platform shield plates made of steel, or any other suitable material.

7. The lawn-mowing and trimming apparatus of claim 2, wherein said protective skirt extending at 45° angle from the bottom end of the side protective shield means is made of steel, or any other suitable material.

8. The lawn-mowing and trimming apparatus of claim 2, wherein said front protective shield means extending down from the front end of the front portion of the platform is a protective plate made of steel, or any other suitable material.

9. the lawn-mowing and trimming apparatus of claim 2, wherein said cylindrical housing is made of steel, or any other suitable material.

10. The lawn-mowing and trimming apparatus of claim 2, wherein said two pulley wheels mounted on the front portion of the platform comprise:
  (a) a steel vertical pulley shaft, extending from the top of the pulley wheel through an orifice provided in the platform for receiving same, and thus, under the platform;
  (b) a circular bottom plate of each pulley wheel, said plate being mounted to the platform by a plurality of bolts;
  (c) a first steel collar piece welded onto the surface of said plate and having a central aperture of approximately the same diameter as each pulley shaft to enable each pulley shaft to pass through and to ensure that each pulley shaft remains in a fixed axis upon rotation;
  (d) second collar piece identical to said first collar piece welded to the underside of the platform directly beneath the first collar piece to further ensure a fixed axis of rotation of said pulley shaft.

* * * * *